Oct. 13, 1936.    J W. DAWSON ET AL    2,057,515

REGULATING SYSTEM

Filed Nov. 3, 1934

WITNESSES:

INVENTORS.
John W. Dawson, and
Einar H. Gulliksen.
BY
Ezra W. Savage
ATTORNEY

Patented Oct. 13, 1936

2,057,515

UNITED STATES PATENT OFFICE 2,057,515

REGULATING SYSTEM

John W. Dawson and Finn H. Gulliksen, Wilkinsburg, Pa., assignors to Westinghouse Electric & Manufacturing Company, East Pittsburgh, Pa., a corporation of Pennsylvania Application November 3, 1934, Serial No. 751,362

4 Claims. (Cl. 171—119)

Our invention relates to electrical regulators of the electronic tube type and it has particular relation to means for improving the quality of performance of electronic tube regulators which are adapted to maintain constant the voltage or other characteristic of a dynamo-electric machine.

One object of our invention is to simplify the equipment and control circuits comprised by alternating-current voltage regulators of the electronic tube type.

Another object of our invention is to stabilize the operation of such regulators without materially impairing their response characteristics.

A further object of our invention is to provide delayed-action anti-hunting means for electronic tube regulators for dynamo-electric machines.

Our invention itself, together with additional objects and advantages thereof, will best be understood through the following description of the specific embodiments, when taken in conjunction with the accompanying drawing, in which.

Figure 1:
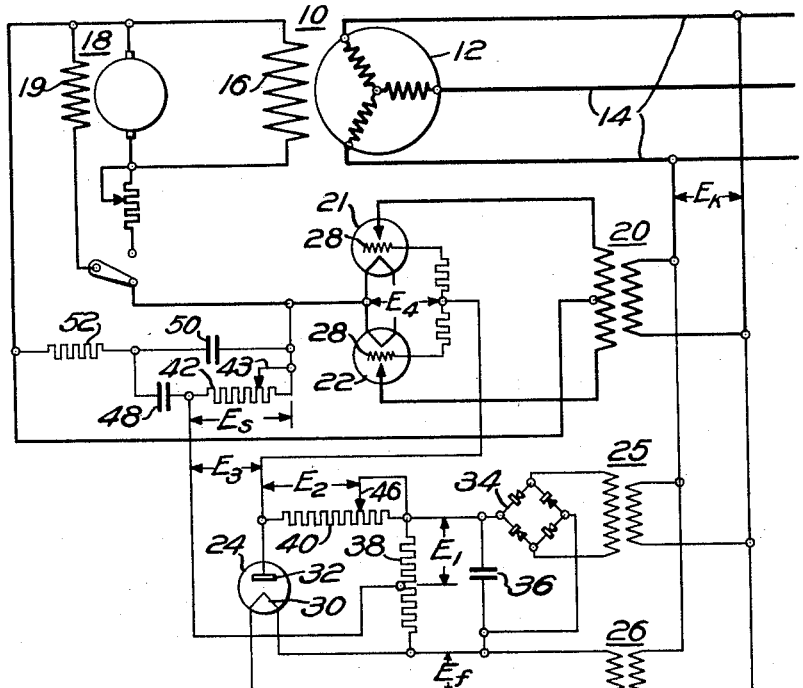
Figure 1 is a diagrammatic representation of the regulating system of our invention shown as being applied to control the voltage of an alternating-current generator.

Referring to the drawing, the electronic tube regulating system depicted in Fig. 1 is shown as being applied to maintain constant the voltage of an alternating-current generator 10, the armature windings 12 of which are connected with a three-phase circuit, represented by conductors 14, and the field winding 16 of which is energized by means of a separate exciter 18. The exciter field winding 19 is supplied with a unidirectional energizing current derived from the generator output circuit 14 through a connection which includes a transformer 20 and a pair of rectifiers, in the form of grid-controlled gas-filled electronic tubes 21 and 22, which are connected in the well known manner illustrated to effect full-wave rectification.

The effective current passed by these tubes is controlled by a grid-voltage supply circuit, which includes a detector tube 24 energized in accordance with the voltage of the regulating circuit 14. The detector circuit functions to impress upon the grid elements 28 of the rectifier tubes 21 and 22 a uni-directional control voltage $E_4$ which varies in accordance with deviations in the regulated voltage $E_k$ from a predetermined or desired value.

In order to eliminate the necessity for a standard potential battery or other equivalent source of reference voltage, we utilize, as a detector, the illustrated two-element tube, the cathode or filament 30 of which is energized, through a transformer 26, by a voltage $E_f$ which varies directly with the voltage in circuit 14 to be maintained constant, and the anode 32 of which has impressed thereon a unidirectional potential also supplied from the regulated circuit through a transformer 25 and a full-wave rectifier 34. Between the rectifier and the detector, filtering apparatus, in the form of a capacitor 36 and a resistor 38, is disposed in well known manner.

The current drawn by this detector tube is passed through a resistor 40, the voltage drop $E_2$ across which varies in accordance with the temperature of the tube filament 30. This voltage $E_2$ is the major component of the control potential $E_4$ impressed upon the excitation supply rectifier tubes 21 and 22. Opposing it and tending to make the tube grids negative, is a second component $E_1$ which comprises the voltage drop across a portion of the resistor 38. Except during periods of exciter field current change when, as will be further explained, there is set up in an anti-hunting resistor 42 a stabilizing potential $E_s$, the voltage $E_4$ impressed upon the tube grids is the same as the detector circuit output voltage $E_3$ which is the algebraic sum of components $E_1$ and $E_2$. Both of these components contain small alternating-current ripples. No attempt to represent these ripples has been made in Fig. 2.

The detector tube 24 is preferably operated at an anode voltage sufficiently high to saturate or place it in a condition in which all of the electrons emitted by the cathode are attracted to the anode. For such a condition, a change in the magnitude of the filament heating potential $E_f$ effects a very high amplified change in the magnitude of the current which the tube draws through the resistor 40. Such a filament controlled detector being essentially a temperature actuated device indicates the root-mean-squared value, instead of the average as does an anode-voltage controlled tube, of the alternating-current voltage, and thus, in addition to being highly sensitive, provides a type of response which is especially desirable when the generator wave formed is subject to deviation from the sinusoidal form.

In operation, the system of Fig. 1 simulates that of a vibratory-contact type of regulator in that adjustment in the current supplied to the exciter field winding 19 may under certain conditions be effected by rendering the rectifier tubes 21 and 22 alternately fully conductive and fully non-conductive, the relative values or ratios of the conducting and non-conducting periods being varied in such manner as to maintain the voltage of the machine 10 at its desired value. The manner in which the illustrated circuits effect such operation will best be understood by reference to Fig. 2, in which curve $E_a$ represents the wave of anode voltage impressed upon each of the rectifier tubes 21 and 22, and curve $E_g$ the critical grid voltage necessary to maintain each tube in a non-conductive state.

Figure 2:
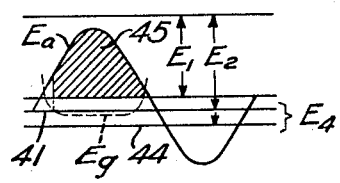
Fig. 2 is a diagram of curves showing the manner in which the excitation supply rectifier tubes of the system of Fig. 1 are controlled.

When the voltage of the regulated circuit 14 is of the desired value, the grid control potential $E_4$ varies between two limits of the general order indicated by the parallel lines 41 and 44 of Fig. 2, this variation resulting from slight fluctuations in the detector filament heating voltage which changes the conductivity characteristics of the rectifier tubes 21 and 22. When this control potential $E_4$ is of the reduced negative value 41, conduction starts at an early point in each positive half cycle of the anode voltage of the rectifier tubes and continues, as is indicated by the shaded area 45 under the curve $E_a$, during the remainder of that half cycle.

However, when, as a result of such conduction, which serves to raise the excitation of machine 10 and thereby starts to increase the voltage, the control potential $E_4$ has been shifted to the greater negative value indicated by line 44, the rectifier tubes are prevented from becoming so completely conductive. The resulting decrease in generator voltage causes the detector tube 24 to again shift the control potential $E_4$ to the tube conductive region 41, and the cycle just described is thereby repeated as long as the regulator operates.

In practice the presence of the before-mentioned alternating-current ripples in the control potential $E_4$ somewhat modifies the described action in that these ripples introduce a combined magnitude and phase-shift control effect which varies the conductivity of the excitation-supply tubes without necessitating the extreme "on and off" action except for large regulated voltage variations.

However, in the absence of such ripples, these repeated on and off periods of tube conduction may occur with a frequency of the general order of several times per second, and because of the inductance characteristics of the machine excitation circuit and that of the exciter, the resulting ripple in regulated voltage is so small as to be practically imperceptible, it being only sufficient to cause the detector tube to produce the alternate conducting and non-conducting periods. When the voltage of circuit 14 is of the normally desired value, the tube conductivity characteristics are automatically maintained such as to cause the exciter 18 to supply to field winding 16 of the regulated machine the proper exciting current to keep the machine voltage at this desired value.

However, upon the occasion of a drop in this voltage, the average temperature of the filament 30 of the detector tube is correspondingly lowered, and the resulting reduction in tube current drawn through resistor 40 reduces the magnitude of control component $E_2$. This makes the grid control voltage $E_4$ less negative with the result that the ratio of the conducting to non-conducting periods of rectified tube operation, when the control variation is this extreme, is correspondingly raised by an amount sufficient to restore the machine voltage back to its desired value.

In a similar manner, a rise in the regulated voltage increases the average temperature of the detector filament, which, in turn, raises the magnitude of component $E_2$ and renders the control voltage $E_4$ of a higher negative value. This, in turn, decreases the ratio of the conducting to non-conducting periods of the excitation supply tubes, when the control variation is this extreme, and lowers the excitation of machine 10 by an amount appropriate to restore the voltage to the desired value.

The value of voltage which the regulating system of Fig. 1 will maintain may be changed by adjusting the position of a tap connection 46 along the detector circuit resistor 40. Such an adjustment varies the value of the control potential component $E_2$ and thereby requires that the detector filament operate at correspondingly changed temperatures to maintain its control of the excitation supply tubes.

In the system of Fig. 1, we have also disclosed a highly improved or delayed-action form of stabilizing or anti-hunting means which prevents overshooting of the corrective actions without substantially detracting from the speed of response of the regulating system. These means comprise the before-mentioned resistor 42 included in the grid control circuit of the excitation supply tubes, which resistor is connected in series with a capacitor 48. The series connected resistor and capacitor are, in turn, energized by the voltage appearing across a second capacitor 50, which, together with a series connected resistor 52, is directly influenced by the voltage $E_x$ appearing across the field winding 19 of the machine exciter 18. As will become apparent presently, the anti-hunting means of our invention are also capable of operation when the voltage $E_x$ applied thereto is derived from the circuit of the main machine field winding 16.

The manner of operation of these anti-hunting means may best be explained by reference to the curves of Fig. 3, which are drawn to illustrate the action resulting from a sudden drop in the regulated voltage $E_k$ which takes place at time $t_1$. Upon the occasion of this drop, the regulating system just explained functions to increase the current supplied to and hence the voltage appearing across the exciter field winding 19. As a result, there is drawn through the resistor 52 a current which acts to charge the capacitor 50 to a value of potential higher than that previously existing. The general manner in which this increase in capacitor voltage takes place is indicated by curve 54 of Fig. 3, from which it will be noted that there is an appreciable delay before the capacitor attains the new value of charge corresponding to the raised exciter field voltage.

As this voltage across the capacitor 50 thus rises, it causes to be forced through the resistor 42 a current which charges the capacitor 48 to a value of potential also higher than that previously existing. This current causes to appear across the resistor the stabilizing voltage $E_s$ which varies in the general manner indicated by curve $E_s$ of Fig. 3. The polarity of this stabilizing voltage is such as to oppose or retard the corrective action which the regulator instituted immediately previous to its appearance. In the specific instance under course of explanation, it combines with the voltage $E_3$ to make the control potential $E_4$ of a higher negative value and thereby so prematurely decreases the effective conductivity of the rectifier tubes 21 and 22 as to prevent the regulator initiated increase in machine excitation from being continued until the regulated voltage is raised above the desired value.

Upon the occasion of an increase in the regulated voltage and a corresponding reduction in the exciting current supplied through the rectifier tubes, an action exactly similar to that above explained takes place with the exception that the capacitors 50 and 48 are allowed to force discharged currents through their associated resistors instead of drawing charging currents through them. This causes the control voltage $E_4$ to be made of lesser negative value than the potential $E_3$ and the corrective action is in this case similarly appropriately arrested.

In both instances, however, this retarding force does not come into effect until an appreciable time after the corrective action has been instituted, and as a result the regulator is much quicker and more effective in settling the disturbed quantity than were the anti-hunting influence to be directly proportional to the magnitude of the corrective action as in comparable anti-hunting systems for electronic tube regulators developed in the past. The performance of one such comparable system is indicated by the dotted sections of the curves of Fig. 3 which illustrate the undesirable retarding effect on regulating action which such comparable systems exert.

Figure 3:
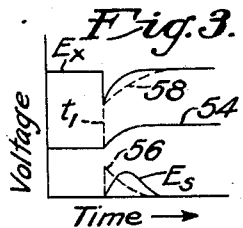
Fig. 3 is a diagram of curves illustrating the superior performance of the delayed action anti-hunting means of our invention.

These prior art systems introduce, as is shown by curved section 56, a corrective action retarding potential which is directly proportional to the rate of change of the corrective adjustment of the machine excitation, and which thus slows it down as shown by the curved section 58 of Fig. 3. In our improved anti-hunting system, however, the regulator is left substantially unimpaired until some appreciable later time represented by the peak of curve $E_4$ when the maximum retarding influence is first exerted. Substantial benefits in regulator response are in this manner made possible.

Figure 4:
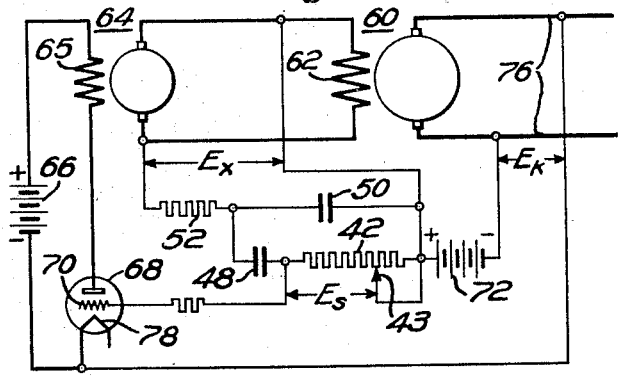
Fig. 4 is a diagrammatic representation of a second form of electronic tube regulating system to which these anti-hunting means are applicable.

Particularly in connection with exciters having a long time constant the field-voltage responsive anti-hunting arrangement of Fig. 1 may with substantial advantage be supplemented by exciter-armature voltage responsive apparatus of the type depicted in Fig. 4. Such a combination is capable of exceedingly broad stabilizing flexibility.

Nor is our improved anti-hunting system restricted to any particular form of electronic tube regulator, since it may, in fact, be successfully applied to any system involving a dynamoelectric machine. A second example of such a system is indicated in Fig. 4 where we have illustrated a direct-current generator 60 as the machine to be regulated. The field winding 62 of the machine is energized by an exciter 64, the field winding of which is arranged to be excited from a suitable direct-current source illustrated in the form of a battery 66.

An electronic tube 68 is connected in the energizing circuit of the exciter field winding 65 and arranged to control the magnitude of current supplied thereto. The grid or control electrode 70 of this tube is connected in a circuit which includes a standard potential battery or other reference source 72 connected in polarity opposition with the generator output circuit 76.

In operation, the equipment just described functions to maintain the voltage of machine 60 at a value which is substantially equal to that of the reference source 72. When the machine voltage is of this normal value, the potential impressed between the grid 70 and the cathode 78 of the tube 68 will preferably be of a relatively small negative value which causes the tube to pass that value of exciter field winding current required to maintain the machine voltage at this desired value a decrease in the regulated voltage $E_k$ lowers the magnitude of this negative control voltage and thereby raises the machine excitation to restore the generator voltage to normal. In a similar manner, a rise above normal in the generator voltage raises the negative bias applied to the tube grid and by reducing the current supplied to the exciter field winding acts to lower the generator excitation and voltage back to the desired value.

Because of the inductance of the exciting circuits of the regulated machine and also of the exciter, the current changes therein do not follow instantly the changes in tube grid bias, with the result that, in the absence of some stabilizing means, the voltage of machine 10 would after each disturbance be corrected beyond the desired point, and oscillation above and below that point would for a considerable period of time thereafter result. When the anti-hunting means of our invention are applied to the system of Fig. 4 in the manner shown, not only do they eliminate this hunting action, but they accomplish this desired result without substantially lowering the speed of the regulator response.

In Fig. 4, as in Fig. 1, these means are shown as comprising a resistor 42 included in the control potential supply circuit of the quantity adjusting tube 68, across which resistor the stabilizing potential $E_s$ appears, a capacitor 48 connected in series with the resistor for energization by the voltage appearing across a second capacitor 50, and a second resistor 52 connected in series with that capacitor for energization by a voltage $E_x$ which is proportional to the excitation of the regulated machine. In Fig. 4, this voltage is derived from the circuit of the main field winding 62 instead of from the exciter field winding circuit as in Fig. 1.

The operation of the anti-hunting means depicted in association with the regulating system of Fig. 4 is substantially similar to that already explained in connection with the system of Fig. 1. As long as the regulated quantity remains constant, the capacitors 50 and 48 remain charged at voltages determined by the particular value of voltage $E_x$ supplied to the machine field winding 62. Upon the occasion of a decrease in the regulated voltage and a resulting increase in the machine excitation, the capacitor 50 draws through resistor 52 a charging current which raises the capacitor voltage to a new value in the manner indicated by curve 54 of Fig. 3. This causes to flow through resistor 52 a charging current for the capacitor 48 which produces across the resistor a stabilizing potential drop $E_s$. The polarity of this voltage is such as to make the potential impressed upon the grid 70 of tube 68 of a higher negative value which prematurely decreases the corrective action and effectively prevents an overshooting thereof.

A rise in the voltage of the regulated machine and the attending decrease in excitation which the regulating system institutes is attended by a similar series of operations which differ from those previously explained in the respect that each of the capacitors 50 and 48 forces a discharging current through the resistor associated therewith which causes the polarity of stabilizing voltage $E_s$ to be reversed, and by lowering the control potential impressed upon the quantity adjusting tube 68 similarly serves to prevent overshooting of the corrective action. As explained in connection with the system of Fig. 1, in both instances this retarding force does not come into effect until an appreciable time after the corrective action has been instituted and the result is that the regulator is capable of settling the disturbed quantity in a much shorter time than where the anti-hunting influence to be directly proportional to the corrective action magnitude.

In order to adjust the stabilizing component $E_s$ to the value most effective for the regulating system and the regulated machine with which the anti-hunting circuit of our invention is used, we provide the resistor 42 with a tap connection 43 which when moved to the right raises the component magnitude and when moved to the left lowers it. We have found that the most effective adjustment is the one in which the stabilizing potential simulates the total inductive lag in the excitation supply circuits of the regulated machine.

Figure 5:
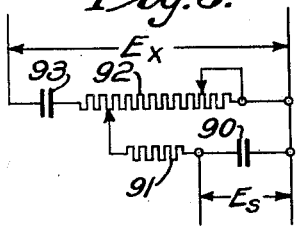
Fig. 5 is a representation of a second form of delayed-action anti-hunting circuit.

Furthermore, we have found that such a simulation may be very closely approximated through the use of other circuit combinations than that specifically disclosed in connection with the systems of Figs. 1 and 4. One such alternative delayed-action anti-hunting circuit is shown in Fig. 5. It will be noted that in that circuit the stabilizing potential $E_s$ is taken from a capacitor 90 which is series-connected with a resistor 91 for energization by the voltage appearing across a second resistor 92. This second resistor is in turn connected through a second capacitor 93 for energization by the voltage $E_x$ which is proportional to the regulated machine. By making both of the resistors widely adjustable and correlating their values with those of two capacitors the desired delayed anti-hunting potential may be supplied to the regulating system.

Figure 6:
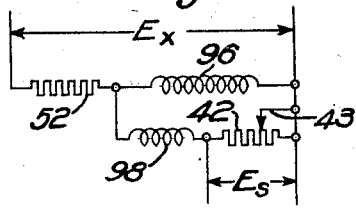
Fig. 6 is a similar representation of the delayed-action anti-hunting circuit of our invention in which the capacitor elements have been replaced by inductors.

Nor is it necessary that capacitors be used in the stabilizing circuits to effect the above-described results since as is shown in Fig. 6 these elements may be replaced by comparably dimensioned inductors 96 and 98. The action of the system of Fig. 6 is closely comparable to the first-explained anti-hunting circuits of Figs. 1 and 4, each of the inductors 96 and 98 introducing a delay in reaching a different final value of voltage upon a change in the excitation-proportional voltage $E_x$.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In a regulating system for a dynamo-electric machine comprising an electronic tube, a controlling circuit and a controlled circuit associated with the tube, means for introducing into the controlling circuit a potential determined by a characteristic of the machine, and machine exciting means responsive to the current in said controlled circuit for adjusting the said characteristic, the combination of stabilizing means comprising a resistor and a capacitor connected in series-circuit relation for energization by the voltage of said exciting means, a second resistor and a second capacitor connected in series-circuit relation for energization by the voltage appearing across said first-named capacitor, and means for introducing into said tube-controlling circuit the voltage appearing across said second-named resistor to thereby delayedly modify the tube control potential in accordance with the rate and direction of change of said exciting means voltage.

2. In a system for regulating a characteristic of a dynamo-electric machine, the combination of means for supplying an exciting current to the machine, an electronic tube for adjusting the magnitude of said current, a circuit for supplying to the tube a control potential determined by the said characteristic of the machine, and delayed-action anti-hunting means comprising a resistor included in said circuit, two delayed-current change elements, means for connecting one of said elements in series with said resistor for energization by the voltage appearing across the second element, a second resistor, and means for connecting said second resistor in series with said second delayed-current change element for energization by a voltage which is proportional to said machine exciting current.

3. In a voltage-regulating system for an electrical generator comprising means for supplying exciting current to that machine, an electronic tube for adjusting the magnitude of said current and a circuit for supplying to the tube a control potential determined by the machine voltage, the combination of delayed-action anti-hunting means comprising a resistor and a capacitor connected in series for energization by a voltage proportional to the machine excitation, a second resistor and a second capacitor connected in series-circuit relation for energization by the voltage appearing across said first-named capacitor, and means for introducing into said tube-control circuit the voltage which appears across said second-named resistor.

4. In a regulating system for a dynamo-electric machine comprising an electronic tube, a controlling circuit and a controlled circuit associated with the tube, means for introducing into the controlling circuit a potential determined by a characteristic of the machine, and machine exciting means responsive to the current in said controlled circuit for adjusting the said characteristic, the combination of stabilizing means comprising a resistor and a delayedcurrent-change element connected in series-circuit relation for energization by the voltage of said exciting means, a second resistor and a second delayed-current change element connected in series-circuit relation for energization by the voltage appearing across said first named delayed current-change element, and means for introducing into said tube-controlling circuit the voltage appearing across said second-named resistor to thereby delayedly modify the tube control potential in accordance with the rate and direction of change of said exciting means voltage.

JOHN W. DAWSON.
FINN H. GULLIKSEN.